US011318415B2

(12) United States Patent
Ochi et al.

(10) Patent No.: US 11,318,415 B2
(45) Date of Patent: May 3, 2022

(54) HUMIDITY CONDITIONING DEVICE AND HUMIDITY CONDITIONING METHOD

(71) Applicant: SHARP KABUSHIKI KAISHA, Sakai (JP)

(72) Inventors: Sho Ochi, Sakai (JP); Tetsuya Ide, Sakai (JP); Tsuyoshi Kamada, Sakai (JP); Makoto Yamada, Sakai (JP); Hiroka Hamada, Sakai (JP); Jun Sakuma, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 127 days.

(21) Appl. No.: 16/623,564

(22) PCT Filed: Jun. 18, 2018

(86) PCT No.: PCT/JP2018/023107
§ 371 (c)(1),
(2) Date: Dec. 17, 2019

(87) PCT Pub. No.: WO2018/235773
PCT Pub. Date: Dec. 27, 2018

(65) Prior Publication Data

US 2021/0129076 A1    May 6, 2021

(30) Foreign Application Priority Data

Jun. 20, 2017 (JP) ............................ JP2017-120514

(51) Int. Cl.
*B01D 53/26* (2006.01)
*B01D 53/14* (2006.01)
(Continued)

(52) U.S. Cl.
CPC ....... *B01D 53/263* (2013.01); *B01D 53/1425* (2013.01); *B01D 53/18* (2013.01); *F24F 3/1417* (2013.01)

(58) Field of Classification Search
CPC . F24F 3/1441; B01D 53/263; B01D 53/1425; B01D 53/18
See application file for complete search history.

(56) References Cited

U.S. PATENT DOCUMENTS

2011/0056384 A1* 3/2011 Kadota ................ F24F 3/1417 96/407
2012/0227582 A1* 9/2012 Wamstad .............. F24F 3/1411 95/91

FOREIGN PATENT DOCUMENTS

CN 103047724 A 4/2013
JP S54-082708 A 7/1979
(Continued)

OTHER PUBLICATIONS

Yao Ye, "Enhancement of mass transfer by ultrasound: Application to adsorbent regeneration and food drying/dehydration", Ultrasonics Sonochemistry, Elsevier, Feb. 2, 2016, vol. 31, p. 512-531.

*Primary Examiner* — Elizabeth J Martin
(74) *Attorney, Agent, or Firm* — ScienBiziP, P.C.

(57) ABSTRACT

A humidity conditioning method includes: the humidity-absorbing step of bringing a hygroscopic liquid containing a hygroscopic material into contact with a first mass of air so that the hygroscopic liquid absorbs moisture in the first mass of air; and the regeneration step of separating moisture from the hygroscopic liquid having absorbed moisture, wherein the regeneration step retains the hygroscopic liquid having absorbed moisture, bombards at least some of the retained hygroscopic liquid with ultrasound to generate misty drop-
(Continued)

lets from the hygroscopic liquid having absorbed moisture, and removes the misty droplets to separate moisture from the hygroscopic liquid.

11 Claims, 9 Drawing Sheets

(51) Int. Cl.

| | |
|---|---|
| ***B01D 53/18*** | (2006.01) |
| ***F24F 3/14*** | (2006.01) |

(56) References Cited

FOREIGN PATENT DOCUMENTS

| | | |
|---|---|---|
| JP | 2001-149737 A | 6/2001 |
| JP | 2010-194483 A | 9/2010 |

* cited by examiner

HUMIDITY CONDITIONING DEVICE AND HUMIDITY CONDITIONING METHOD

TECHNICAL FIELD

The present invention, in some aspects thereof, relates to humidity conditioning devices and humidity conditioning methods.

The present application claims the benefit of priority to Japanese Patent Application, Tokugan, No. 2017-120514 filed on Jun. 20, 2017, the entire contents of which are incorporated herein by reference.

BACKGROUND ART

Humidity conditioning elements containing an adsorbent have been known and popularly used in humidity conditioning and like devices (see, Patent Literature 1). Such a humidity conditioning element includes, for example, a support with a honeycomb or cardboard structure. The support provides numerous air distribution paths.

The support carries, on its surface, adsorbent powder of an inorganic material, such as zeolite, silica gel, or activated carbon, retained by a binder. As air is passed through the air distribution paths in the humidity conditioning element, the adsorbent adsorbs water contained in vapor and other form in the air, thereby drying the air.

CITATION LIST

Patent Literature

Patent Literature 1: Japanese Unexamined Patent Application Publication, Tokukai, No. 2001-149737

SUMMARY OF INVENTION

Technical Problem

The dehumidifier (humidity conditioning device) of Patent Literature 1 is used repeatedly. The water content adsorbed (absorbed) from the target air needs to be desorbed (separated out) afterward, in order to restore the water-adsorbing capability of the dehumidifier. In conventional dehumidifiers that rely on the use of a dehumidifying agent (adsorbent), however, the adsorbed water content inevitably undergoes a liquid-to-gas phase change in a desorption process and to this end requires energy supply in excess of the latent heat thereof. Conventional dehumidifiers therefore consume problematically large electric power.

The present invention, in an aspect thereof, has been made in view of this problem and has an object to provide a humidity conditioning device and a humidity conditioning method that are capable of adsorbing and desorbing moisture at low power consumption.

Solution to Problem

To solve the above problem, the present invention, in an aspect thereof, provides a humidity conditioning method including: the humidity-absorbing step of bringing a hygroscopic liquid containing a hygroscopic material into contact with a first mass of air so that the hygroscopic liquid absorbs moisture in the first mass of air; and the regeneration step of separating moisture from the hygroscopic liquid having absorbed moisture, wherein the regeneration step retains the hygroscopic liquid having absorbed moisture, bombards at least some of the retained hygroscopic liquid with ultrasound to generate misty droplets from the hygroscopic liquid having absorbed moisture, and removes the misty droplets to separate moisture from the hygroscopic liquid.

The method, in an aspect of the present invention, may be configured such that the humidity-absorbing step brings the hygroscopic liquid into contact with the first mass of air while cooling the hygroscopic liquid.

The method, in an aspect of the present invention, may be configured such that the regeneration step bombards the hygroscopic liquid with ultrasound while heating the hygroscopic liquid having absorbed moisture.

The method, in an aspect of the present invention, may be configured such that the humidity-absorbing step reuses the hygroscopic liquid from which moisture has been separated in the regeneration step.

The method, in an aspect of the present invention, may be configured such that at least some of the misty droplets are discharged into a second mass of air that is present in a different location or at a different time than the first mass of air.

The method, in an aspect of the present invention, may be configured such that at least some of the misty droplets are retrieved to obtain and retain a first liquid.

The method, in an aspect of the present invention, may be configured such that at least some of the retained first liquid is bombarded with ultrasound to generate misty droplets from the first liquid.

The method, in an aspect of the present invention, may be configured such that the misty droplets include coarse droplets containing some of the hygroscopic material and that the coarse droplets are separated out and retrieved to obtain a second liquid and mix at least some of the second liquid with the hygroscopic liquid.

The method, in an aspect of the present invention, may be configured such that the second liquid is retained and that at least some of the retained second liquid is bombarded with ultrasound to generate misty droplets of the second liquid from the second liquid.

The present invention, in an aspect thereof, provides a humidity conditioning device including: a housing having an internal space; and a reservoir unit in the internal space, the reservoir unit being configured to retain a hygroscopic liquid containing a hygroscopic material, wherein the reservoir unit includes: an absorption-inducing means configured to feed air outside the housing to the internal space to bring the air and the hygroscopic liquid in the internal space into contact with each other, so that the hygroscopic liquid absorbs moisture in the air; an air outlet port connecting the reservoir unit to an outside of the housing in a spatially continuous manner; a first ultrasound generator configured to bombard at least some of the hygroscopic liquid having absorbed moisture with ultrasound; and a first means configured to remove misty droplets generated from the hygroscopic liquid having absorbed moisture.

The device, in an aspect of the present invention, may be configured so as to further include a cooling mechanism configured to cool the hygroscopic liquid.

The device, in an aspect of the present invention, may be configured so as to further include a heating mechanism configured to heat the hygroscopic liquid having absorbed moisture.

The device, in an aspect of the present invention, may be configured so as to further include a collecting unit configured to retrieve at least some of the misty droplets to obtain and collect a first liquid.

The device, in an aspect of the present invention, may be configured such that the collecting unit includes: a second ultrasound generator configured to bombard at least some of the collected first liquid with ultrasound; and a second means configured to remove misty droplets generated from the first liquid.

The device, in an aspect of the present invention, may be configured such that the misty droplets include coarse droplets containing some of the hygroscopic material, the humidity conditioning device further including a mixing means configured to separate out and retrieve the coarse droplets to obtain a second liquid and configured further to mix at least some of the second liquid with the hygroscopic liquid.

The device, in an aspect of the present invention, may be configured so as to further include: a third ultrasound generator configured to bombard at least some of the second liquid with ultrasound; and a third means configured to remove misty droplets of the second liquid generated from the second liquid.

The device, in an aspect of the present invention, may be configured such that the air outlet port includes a first air outlet port and a second air outlet port and that the first means includes a compartment to which the first air outlet port is open, a compartment to which the second air outlet port is open, and a guide member dividing an interior of the reservoir unit.

The device, in an aspect of the present invention, may be configured such that the air outlet port includes a first air outlet port and a second air outlet port, that the reservoir unit includes a first reservoir unit, a second reservoir unit, and a flow path connecting the first reservoir unit to the second reservoir unit, that the first reservoir unit is provided with the absorption-inducing means and the first air outlet port, and that the second reservoir unit is provided with the first ultrasound generator, the first means, and the second air outlet port.

The device, in an aspect of the present invention, may be configured so as to further include: a first air inlet tube connecting the absorption-inducing means to a first space; a second air inlet tube connecting the absorption-inducing means to a second space; a first switching section configured to switch between the first air inlet tube and the second air inlet tube; a third air outlet tube connecting the second air outlet port to the first space; a fourth air outlet tube connecting the second air outlet port to the second space; and a second switching section configured to switch between the third air outlet tube and the fourth air outlet tube, wherein the first switching section and the second switching section operate in concert so as to suck in air from either one of the first space and the second space and vent out the air into the other one of the first space and the second space.

The device, in an aspect of the present invention, may be configured such that the first space is an indoor space and that the second space is an outdoor space.

The device, in an aspect of the present invention, may be configured such that the first ultrasound generator includes: a main body unit configured to generate ultrasound; a float having a lower specific gravity than the hygroscopic liquid; and a linking section linking the main body unit to the float.

Advantageous Effects of Invention

The present invention, in an aspect thereof, provides a humidity conditioning device and a humidity conditioning method that are capable of adsorbing and desorbing moisture at low power consumption.

DESCRIPTION OF EMBODIMENTS

First Embodiment

The following will describe a humidity conditioning device and a humidity conditioning method in accordance with a first embodiment of the present invention with reference to drawings. The drawings referred to in the following description may show some features out of proportion for the sake of emphasis. The relative dimensions and related factors of constituent elements may differ from their actual values for convenience. Non-feature elements may be omitted from the drawings for similar reasons. The drawings show a Z-axis. The Z-axis in the present specification coincides with the direction in which the humidity conditioning device is installed in accordance with an embodiment of the present invention. The upward direction from the humidity conditioning device is defined as the positive Z-direction.

A humidity conditioning method in accordance with the present embodiment includes: the humidity-absorbing step of bringing a hygroscopic liquid containing a hygroscopic material into contact with a first mass of air such that the hygroscopic liquid can absorb moisture in the first mass of air; and the regeneration step of separating moisture from the hygroscopic liquid having absorbed moisture.

"Regeneration" as used in the present specification is the separation of moisture from a hygroscopic liquid having absorbed moisture so as to restore the moisture-absorbing capability of the hygroscopic liquid.

Humidity Conditioning Device

The following will describe a humidity conditioning device used to implement a humidity conditioning method in accordance with the present embodiment.

Figure 1:
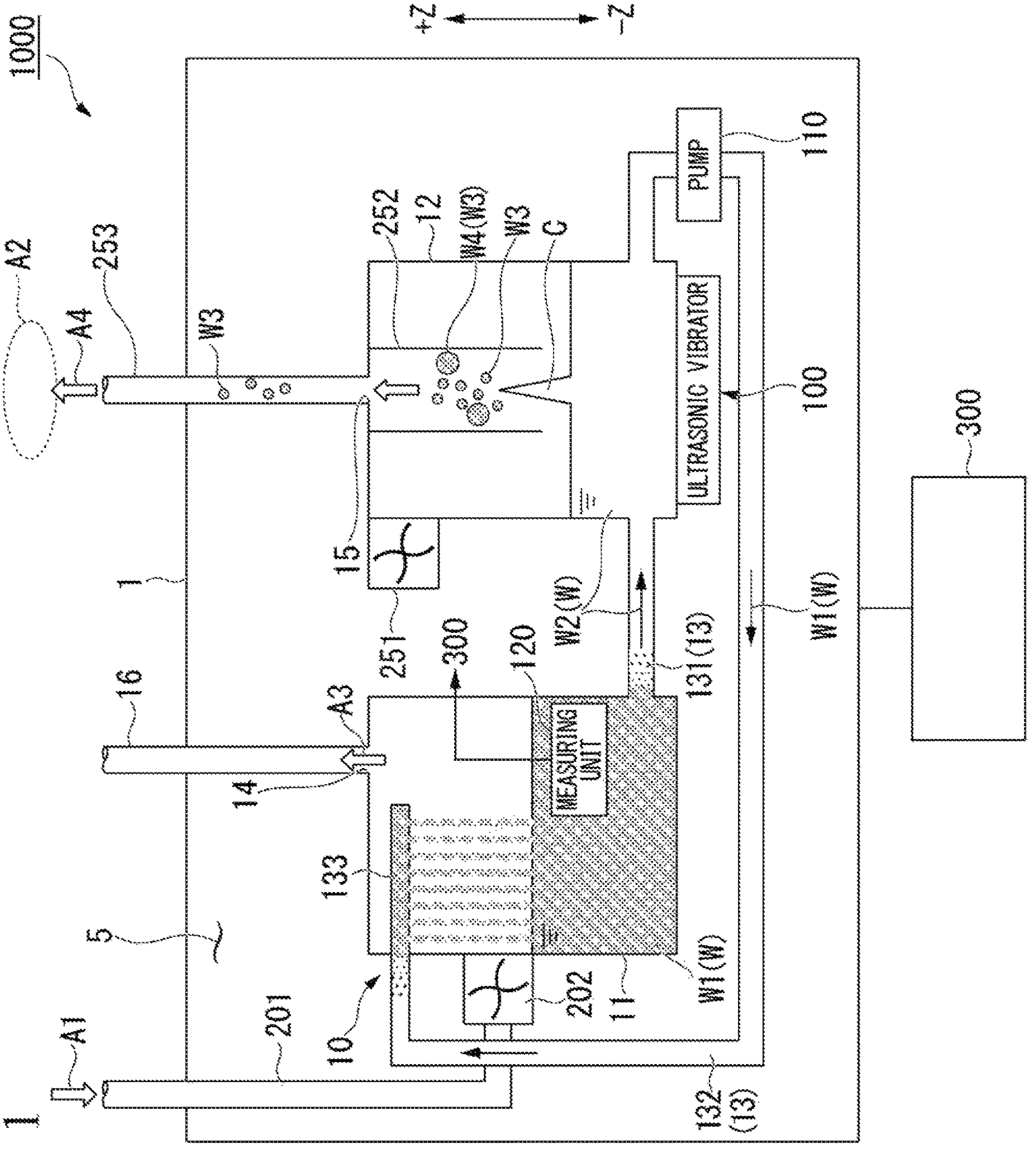
FIG. 1 is a schematic cross-sectional view of a humidity conditioning device 1000 in accordance with a first embodiment.

FIG. 1 is a schematic diagram of a structure of a humidity conditioning device 1000 in accordance with the first embodiment. Referring to FIG. 1, the humidity conditioning device 1000 in accordance with the present embodiment includes a housing 1, a reservoir unit 10, a measuring unit 120, and a control unit 300.

Housing

The housing 1 in accordance with the present embodiment has an internal space 5. The housing 1 in accordance with the present embodiment houses at least the reservoir unit 10 in the internal space 5.

Reservoir Unit

The reservoir unit 10, disposed in the internal space 5, contains hygroscopic liquid W, which will be described later in detail. The reservoir unit 10 includes a first reservoir unit 11, a second reservoir unit 12, and a flow path 13.

Throughout the following description, the liquid used in a process in the first reservoir unit 11 will be referred to as "hygroscopic liquid W1," whereas the liquid used in a process in the second reservoir unit 12 will be referred to as "hygroscopic liquid W2." Hygroscopic liquids W1 and W2 may be in some cases collectively referred to as "hygroscopic liquid W."

Hygroscopic liquid W2 in the present specification is an equivalent of the hygroscopic liquid having absorbed moisture recited in the claims.

Again, throughout the following description, the air treated in the first reservoir unit 11 will be referred to "air mass A1." The air discharged from the first reservoir unit 11 will be referred to as "air mass A3." The air discharged from the second reservoir unit 12 will be referred to as "air mass A4." The air mixed with air mass A4 will be referred to as "air mass A2."

Air mass A1 in the present specification is an equivalent of the first mass of air recited in the claims. Air mass A2 in the present specification is an equivalent of the second mass of air recited in the claims.

Air masses A1 and A2 are present in different locations or at different times in an aspect of the present invention. In an aspect of the present invention, air masses A1 and A2 are present in the same location if they are present at different times and present at the same time if they are present in different locations.

The following embodiment will describe air masses A1 and A2 as being present at different times.

First Reservoir Unit

The first reservoir unit 11 includes a tube 201, a blower 202, a nozzle unit 133, and a first air outlet port 14.

The combined structure of the tube 201, the blower 202, and the nozzle unit 133 in the present specification is an equivalent of the absorption-inducing means recited in the claims.

The tube 201 connects the internal space 5 of the housing 1 to the outside of the housing 1 so that the internal space 5 is spatially continuous with the outside. The tube 201 has a first end thereof connected to the blower 202, which supplies air mass A1 from the outside the housing 1. The tube 201 has a second end thereof located outside the housing 1.

The blower 202 sucks in air mass A1 through the second end of the tube 201, so that the blower 202 can push air mass A1 outside the housing 1 into the internal space 5 of the housing 1 via the tube 201. Upon being pushed in by the blower 202, air mass A1 forms an air current heading for the first air outlet port 14 (detailed later) from the blower 202 and comes into contact with hygroscopic liquid W1. The humidity conditioning device 1000 in accordance with the present embodiment, thus structured, can bring air mass A1 into contact with hygroscopic liquid W1 in the internal space 5, so that hygroscopic liquid W1 can absorb moisture in air mass A1.

The first air outlet port 14 discharges, to the outside of the housing 1, air mass A3 obtained from air mass A1 by hygroscopic liquid W1 absorbing moisture from air mass A1. To the first air outlet port 14 is connected a tube 16 for guiding air mass A3 to the outside of the housing 1. The tube 16 connects the inside of the first reservoir unit 11 to the outside of the housing 1 in a spatially continuous manner.

Since air mass A3 is obtained from air mass A1 by removing moisture from air mass A1, air mass A3 is drier than air mass A1 residing outside the housing 1.

The first reservoir unit 11 houses therein the measuring unit 120, which will be described later in detail.

Second Reservoir Unit

The second reservoir unit 12 includes a second air outlet port 15, an ultrasonic vibrator 100, a blower 251, and a guide tube 252.

The ultrasonic vibrator 100 in the present specification is an equivalent of the first ultrasound generator recited in the claims.

The guide tube 252 in the present specification is an equivalent of the guide member recited in the claims.

The combined structure of the blower 251 and the guide tube 252 in the present specification is an equivalent of the first means recited in the claims.

The combined structure of the first air outlet port 14 and the second air outlet port 15 in the present specification is an equivalent of the air outlet port recited in the claims.

The ultrasonic vibrator 100 bombards hygroscopic liquid W2 with ultrasound to generate moisture-containing misty droplets W3 from hygroscopic liquid W2. The ultrasonic vibrator 100 in FIG. 1 is in contact with the bottom face (negative Z end) of the second reservoir unit 12.

Liquid column C of hygroscopic liquid W2 can form on the liquid surface of hygroscopic liquid W2 upon the ultrasonic bombardment of hygroscopic liquid W2 by the ultrasonic vibrator 100. Misty droplets W3 are generated in large numbers from liquid column C of hygroscopic liquid W2.

The second air outlet port 15 discharges and removes air mass A4 containing misty droplets W3 into air mass A2 residing outside the housing 1, thereby separating moisture from hygroscopic liquid W2. To the second air outlet port 15 in FIG. 1 is connected a tube 253 for discharging air mass A4 into air mass A2. The tube 253 connects the second reservoir unit 12 to the outside of the housing 1 in a spatially continuous manner. The second air outlet port 15 is located directly above the ultrasonic vibrator 100.

Air mass A4 contains generated misty droplets W3 and is therefore wetter than air mass A2 outside the housing 1.

The blower 251 feeds air from the outside of the housing 1 into the second reservoir unit 12, thereby generating an air current flowing from the inside of the second reservoir unit 12 to the outside of the housing 1 via the second air outlet port 15.

The guide tube 252 guides misty droplets W3 generated from hygroscopic liquid W2 to the second air outlet port 15. The guide tube 252 is located to surround the second air outlet port 15 when viewed from above.

Since the second air outlet port 15 is located directly above the ultrasonic vibrator 100 in the humidity conditioning device 1000 in accordance with the present embodiment, liquid column C of hygroscopic liquid W2 forms below (in the negative Z-direction from) the second air outlet port 15. Therefore, the guide tube 252 surrounds liquid column C of hygroscopic liquid W2 in the humidity conditioning device 1000 in accordance with the present embodiment. These relative positions of the second air outlet port 15, the guide tube 252, and liquid column C enable the air current moving in the positive Z-direction from the liquid surface of hygroscopic liquid W2 to carry misty droplets W3 generated in liquid column C of hygroscopic liquid W2 to the second air outlet port 15.

The flow path 13 connects the first reservoir unit 11 to the second reservoir unit 12. The flow path 13 couples to a pump 110 circulating hygroscopic liquid W to the reservoir unit 10. The flow path 13 includes a flow path 131 and a flow path 132.

The flow path 131 transports hygroscopic liquid W from the first reservoir unit 11 to the second reservoir unit 12. The flow path 131 has a first end thereof connected to a lower portion of the first reservoir unit 11 below the liquid surface of hygroscopic liquid W1 contained in the first reservoir unit 11. Meanwhile, the flow path 131 has a second end thereof connected to a lower portion of the second reservoir unit 12 below the liquid surface of hygroscopic liquid W2 contained in the second reservoir unit 12.

The flow path 132 transports hygroscopic liquid W from the second reservoir unit 12 to the first reservoir unit 11. The flow path 132 has a first end thereof connected to a lower portion of the second reservoir unit 12 below the liquid surface of hygroscopic liquid W2 contained in the second reservoir unit 12. Meanwhile, the flow path 132 has a second end thereof connected to an upper portion of the first reservoir unit 11 above the liquid surface of hygroscopic liquid W1 contained in the first reservoir unit 11.

The nozzle unit 133 causes hygroscopic liquid W1 to fall under gravity practically like columns inside the first reservoir unit 11. The nozzle unit 133 is disposed in an upper portion of the first reservoir unit 11 and is spatially continuous with the second end of the flow path 132. As mentioned earlier, the blower 202 generates an air flow of air mass A1 inside the first reservoir unit 11. The columns of hygroscopic liquid W1 are brought into contact with this air flow of air mass A1 so that hygroscopic liquid W1 can absorb moisture in air mass A1. This humidity-absorbing mechanism for air mass A1 is typically referred to as a "free-fall mechanism."

Hygroscopic Liquid

Hygroscopic liquid W of the present embodiment absorbs moisture and preferably so at 25° C. and 50% relative humidity and under atmospheric pressure.

Hygroscopic liquid W of the present embodiment contains a hygroscopic material and may alternatively contain a hygroscopic material and a solvent. Examples of such a solvent include water and other like solvents that dissolve, or are miscible with, a hygroscopic material.

The hygroscopic material may be either organic or inorganic.

The organic substance used as the hygroscopic material may be, as examples, a non-monohydric alcohol, a ketone, an organic solvent with an amide group(s), a saccharide, or a publicly known substance used as a starting material for moisture-retaining cosmetics and other like products.

Among these examples, the organic substance used as the hygroscopic material is preferably a non-monohydric alcohol, an organic solvent with an amide group(s), a saccharide, or a publicly known substance used as a starting material for moisture-retaining cosmetics and other like products for their high hydrophilicity.

The non-monohydric alcohol may be, for example, glycerol, propanediol, butanediol, pentanediol, trimethylolpropane, butanetriol, ethylene glycol, diethylene glycol, or triethylene glycol.

The organic solvent with an amide group(s) may be, for example, formamide or acetamide.

The saccharide may be, for example, sucrose, pullulan, glucose, xylol, fructose, mannitol, or sorbitol.

The publicly known substance used as a starting material for moisture-retaining cosmetics and other like products may be, for example, 2-methacryloyloxyethyl phosphorylcholine (MPC), betaine, hyaluronic acid, or collagen.

The inorganic substance used as the hygroscopic material may be, as examples, calcium chloride, lithium chloride, magnesium chloride, potassium chloride, sodium chloride, zinc chloride, aluminum chloride, lithium bromide, calcium bromide, potassium bromide, sodium hydroxide, or sodium pyrrolidone carboxylate.

A high-hydrophilicity hygroscopic material, for example, if mixed with water, increases the proportion of water molecules near the surface (liquid surface) of hygroscopic liquid W. In the regeneration step described later in detail, misty droplets W3 are generated near the surface of hygroscopic liquid W2 to separate moisture from hygroscopic liquid W2. The increased proportion of water molecules near the surface of hygroscopic liquid W therefore can help efficient separation of moisture.

For the same reason, the proportion of the hygroscopic material near the surface of hygroscopic liquid W is decreased, which in turn limits loss of the hygroscopic material in the regeneration step.

Hygroscopic liquid W of the present embodiment preferably has a viscosity of 100 mPa·s or less. Under this condition, liquid column C of hygroscopic liquid W2 is likely to form on the liquid surface of hygroscopic liquid W2 in the regeneration step described later in detail, which can help efficient separation of moisture from hygroscopic liquid W2.

Measuring Unit

The measuring unit 120 measures the concentration of the hygroscopic material in hygroscopic liquid W1. The measuring unit 120 includes a device capable of measuring the concentration of the hygroscopic material in hygroscopic liquid W1. The measuring unit 120 outputs results of measurement to the control unit 300, which will be described later in detail.

Control Unit

The control unit 300 controls on the basis of the results of measurement produced by the measuring unit 120, such that the concentration of the hygroscopic material in hygroscopic liquid W1 falls into a desirable range of concentration. The "desired concentration," as used herein, is a range of concentration that is suitable for the hygroscopic liquid to absorb moisture and is, for example, 40 mass % or higher.

The control unit 300 controls at least one of the devices selected from the group consisting of the ultrasonic vibrator 100, the pump 110, the blower 202, and the blower 251 such that the concentration of the hygroscopic material becomes equal to the desired concentration.

Humidity Conditioning Method

A description will be now given of a humidity conditioning method that involves use of the above-described humidity conditioning device 1000. In the humidity conditioning device 1000 shown in FIG. 1, the pump 110 is powered on to continuously circulate hygroscopic liquid W in the reservoir unit 10.

The present embodiment includes a humidity-absorbing step where the blower 202 for the first reservoir unit 11 is powered on to push air mass A1 outside the housing 1 into the internal space 5 of the housing 1 via the tube 201. Air mass A1 hence comes into contact with hygroscopic liquid W1 in the first reservoir unit 11, so that hygroscopic liquid W1 can absorb moisture in air mass A1.

In the humidity-absorbing step of the present embodiment, moisture is removed from air mass A1 to obtain air mass A3, and air mass A3 thus obtained is discharged through the first air outlet port 14 of the first reservoir unit 11.

The present embodiment includes a regeneration step where hygroscopic liquid W2 is first stored in the second reservoir unit 12. The ultrasonic vibrator 100 is then powered on to bombard at least some of hygroscopic liquid W2 with ultrasound, thereby generating moisture-containing misty droplets W3 from hygroscopic liquid W2. Meanwhile, the blower 251 for the second reservoir unit 12 is powered on to generate an air current in the second reservoir unit 12. This air current carries air mass A4 containing misty droplets W3 to the second air outlet port 15 and discharges air mass A4 into air mass A2 outside the housing 1.

In the regeneration step of the present embodiment, the quantity of generated misty droplets W3 can be controlled using various methods.

As a first such example, the quantity of generated misty droplets W3 can be controlled in the regeneration step of the present embodiment, by adjusting either one or both of the frequency of the ultrasonic vibrator 100 and the power supply to the ultrasonic vibrator 100.

The frequency of the ultrasonic vibrator 100, although variable depending on the type of hygroscopic liquid W, is preferably, for example, from 1.0 MHz to 5.0 MHz both inclusive in the regeneration step of the present embodiment. The frequency of the ultrasonic vibrator 100 within this range can increase the quantity of generated misty droplets W3.

The power supply to the ultrasonic vibrator 100, although variable depending on the type of hygroscopic liquid W and the type of the ultrasonic vibrator 100, is preferably, for example, 5 watts or greater and more preferably, for example, 10 watts or greater in the regeneration step of the present embodiment. The power supply to the ultrasonic vibrator 100 of 5 watts or greater can increase the quantity of generated misty droplets W3.

The quantity of generated misty droplets W3 can also be controlled in the regeneration step of the present embodiment by adjusting the depth at which the surface of the ultrasonic vibrator 100 resides below the liquid surface of hygroscopic liquid W. In other words, the quantity of generated misty droplets W3 can be controlled in the regeneration step of the present embodiment by adjusting the distance from the bottom face (negative Z end) of the second reservoir unit 12 to the liquid surface of hygroscopic liquid W.

The distance from the bottom face of the second reservoir unit 12 to the liquid surface of hygroscopic liquid W is preferably from 1 cm to 6 cm both inclusive in the regeneration step of the present embodiment. When the distance is 1 cm or longer, there is low risk of activating the ultrasonic vibrator 100 with a zero or insufficient amount of hygroscopic liquid W, and the quantity of generated misty droplets W3 can be sufficiently increased. Meanwhile, when the distance is 6 cm or shorter, liquid column C of hygroscopic liquid W2 can form, thereby efficiently generating misty droplets W3.

Moisture is separated from hygroscopic liquid W2 to regenerate hygroscopic liquid W2 in the regeneration step of the present embodiment.

According to the humidity conditioning method in accordance with the present embodiment, hygroscopic liquid W1 obtained in the regeneration step is returned to the first reservoir unit via the flow path 13 for reuse in the above-described humidity-absorbing step, which completes an implementation of the humidity conditioning method in accordance with the present embodiment.

As described in the foregoing, the humidity conditioning method in accordance with the present embodiment utilizes ultrasound to perform the regeneration step on hygroscopic liquid W2. The moisture in hygroscopic liquid W2 is turned into misty droplets W3 and separated from hygroscopic liquid W2 in the regeneration step of the present embodiment. It is therefore believed that unlike the regeneration step of a conventional humidity conditioning method, the regeneration step of the present embodiment involves almost no liquid-to-gas phase change of water. The humidity conditioning method in accordance with the present embodiment hence consumes low energy and is regenerative.

Control of the size of misty droplets W3 in the regeneration step of the present embodiment can limit loss of the hygroscopic material in hygroscopic liquid W. The humidity conditioning method in accordance with the present embodiment can therefore preserve its efficiency even after repeatedly implemented.

The present embodiment provides a humidity conditioning device and a humidity conditioning method that are capable of adsorbing and desorbing moisture at low power consumption.

Second Embodiment

The following will describe a humidity conditioning device and a humidity conditioning method in accordance with a second embodiment of the present invention with reference to drawings.

Humidity Conditioning Device

Figure 2:
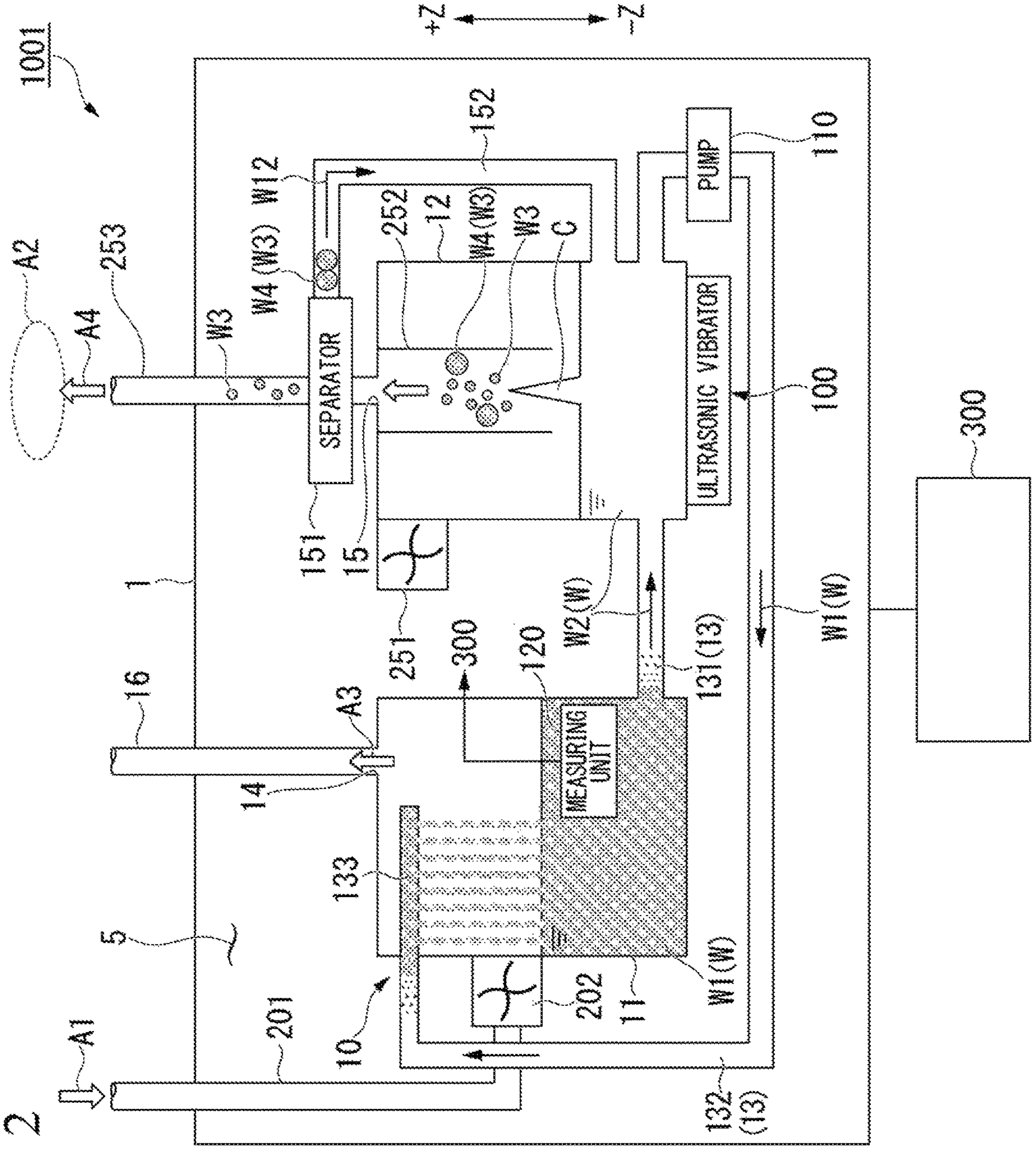
FIG. 2 is a schematic cross-sectional view of a humidity conditioning device 1001 in accordance with a second embodiment.

FIG. 2 is a schematic cross-sectional view of a humidity conditioning device 1001 in accordance with the second embodiment. Referring to FIG. 2, the humidity conditioning device 1001 in accordance with the second embodiment includes a housing 1, a reservoir unit 10, a measuring unit 120, a separator 151, a flow path 152, and a control unit 300. Members of the present embodiment that are the same as those in the first embodiment are accordingly indicated by the same reference signs or numerals, and detailed description thereof is omitted.

The combined structure of the separator 151 and the flow path 152 in the present specification is an equivalent of the mixing means recited in the claims.

Separator 151

The inventors have researched and found out that misty droplets W3 generated from hygroscopic liquid W2 include micrometer-sized, relatively large, coarse droplets W4. The inventors have also found out that coarse droplets W4 contain some of the hygroscopic material dissolved in hygroscopic liquid W.

Accordingly, in the humidity conditioning device 1001 in accordance with the present embodiment, the separator 151 separates out and retrieves coarse droplets W4 and mixes at least some of retrieved liquid W12 with hygroscopic liquid W2. The humidity conditioning device 1001 in accordance with the present embodiment, thus arranged, can limit loss of the hygroscopic material in hygroscopic liquid W.

Liquid W12 in the present specification is an equivalent of the second liquid recited in the claims.

The separator 151 is not limited in any particularly manner so long as it is capable of separating out and retrieving coarse droplets W4. The separator 151 may be, for example, a publicly known mist separator or a film module including a publicly known gas-transmitting film.

Examples of publicly known mist separators include cyclone separators, mist separators equipped with a mesh filter called "demisters," and mist separators equipped with a corrugated sheet called "chevrons."

The flow path 152 transports at least some of obtained liquid W12 to the second reservoir unit 12 where transported liquid W12 is mixed with hygroscopic liquid W2. The flow path 152 runs external to the second reservoir unit, connecting the separator 151 to the second reservoir unit 12.

Humidity Conditioning Method

A description will be now given of a humidity conditioning method that involves use of the above-described humidity conditioning device 1001. In the humidity conditioning method in accordance with the second embodiment, the separator 151 separates and retrieves coarse droplets W4 from misty droplets W3. Retrieved liquid W12 is fed via the flow path 152 and mixed with hygroscopic liquid W2 in the second reservoir unit 12.

The present embodiment provides a humidity conditioning device and a humidity conditioning method that are capable of adsorbing and desorbing moisture at low power consumption. The additional use of the separator 151 can further limit loss of the hygroscopic material in hygroscopic liquid W. The humidity conditioning method in accordance with the present embodiment can therefore preserve its efficiency even after repeatedly implemented.

Third Embodiment

The following will describe a humidity conditioning device and a humidity conditioning method in accordance with a third embodiment of the present invention with reference to drawings.

Humidity Conditioning Device

Figure 3:
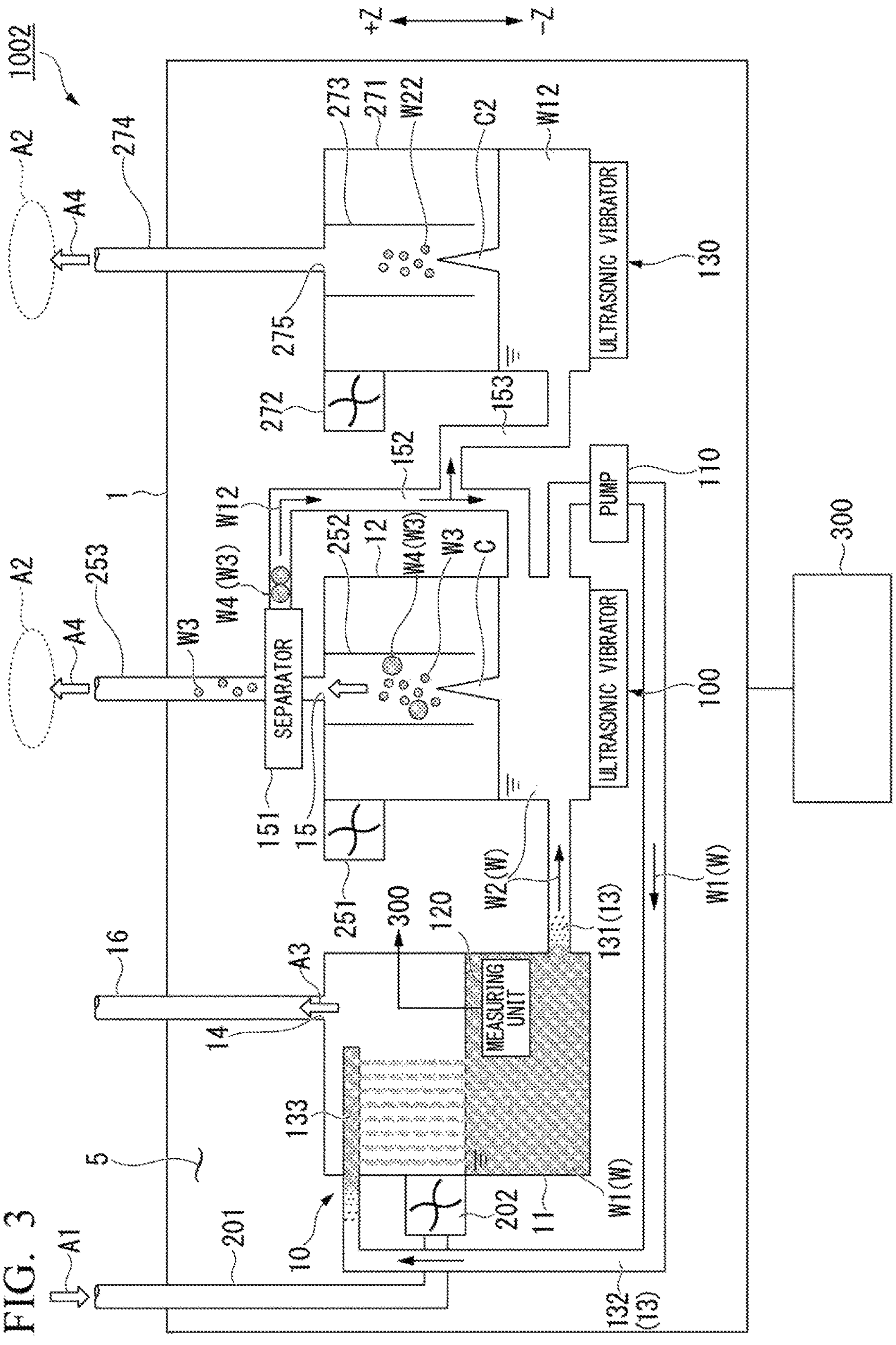
FIG. 3 is a schematic cross-sectional view of a humidity conditioning device 1002 in accordance with a third embodiment.

FIG. 3 is a schematic cross-sectional view of a humidity conditioning device 1002 in accordance with the third embodiment. Referring to FIG. 3, the humidity conditioning device 1002 in accordance with the third embodiment includes a housing 1, a reservoir unit 10, a measuring unit 120, a separator 151, a flow path 152, a flow path 153, a separating unit 271, and a control unit 300. Members of the present embodiment that are the same as those in the second embodiment are accordingly indicated by the same reference signs or numerals, and detailed description thereof is omitted.

The separating unit 271 separates out and retains liquid W12 retrieved from coarse droplets W4.

The separating unit 271 includes an ultrasonic vibrator 130, an opening 275, a blower 272, and a guide tube 273.

The ultrasonic vibrator 130 in the present specification is an equivalent of the third ultrasound generator recited in the claims.

The combined structure of the blower 272 and the guide tube 273 in the present specification is an equivalent of the third means recited in the claims.

The ultrasonic vibrator 130 bombards liquid W12 with ultrasound to generate misty droplets W22 from liquid W12. The ultrasonic vibrator 130 in FIG. 1 is in contact with the bottom face (negative Z end) of the separating unit 271.

Misty droplets W22 in the present specification are an equivalent of the misty droplets of the second liquid recited in the claims.

The opening 275 discharges air mass A4 containing misty droplets W22 into air mass A2 residing outside the housing 1, thereby removing air mass A4. The opening 275 in FIG. 3 is connected to a tube 274 for guiding air mass A4 containing misty droplets W22 to the outside of the housing 1. The tube 274 connects the separating unit 271 to the outside of the housing 1 in a spatially continuous manner. The opening 275 is located directly above the ultrasonic vibrator 130.

The blower 272 feeds air from the outside of the housing 1 into the separating unit 271, thereby generating an air current flowing from the inside of the separating unit 271 to the outside of the housing 1 via the opening 275.

The guide tube 273 guides misty droplets W22 generated from liquid W12 to the opening 275. The guide tube 273 is located to surround the opening 275 when viewed from above.

Since the opening 275 is located directly above the ultrasonic vibrator 130 in the humidity conditioning device 1002 in accordance with the present embodiment, liquid column C2 of liquid W12 forms below (in the negative Z-direction from) the opening 275. Therefore, the guide tube 273 surrounds liquid column C2 of liquid W12 in the humidity conditioning device 1002 in accordance with the present embodiment. These relative positions of the opening 275, the guide tube 273, and liquid column C2 enable the air current moving in the positive Z-direction from the liquid surface of liquid W12 to carry misty droplets W22 generated in liquid column C2 of liquid W12 to the opening 275.

The flow path 153 branches off from the flow path 152 and connects to the separating unit 271. The flow path 153 transports some of liquid W12 to the separating unit 271.

The hygroscopic material dissolved in hygroscopic liquid W, in the humidity conditioning device 1002 in accordance with the present embodiment, is one of the above-described publicly known substances used as starting materials for moisture-retaining cosmetics and other like products. These publicly known substances used as starting materials for moisture-retaining cosmetics and other like products are known to have a high moisture-retention capability. Skin moisture retention effects are therefore expected from the use of misty droplets W22 generated from liquid W12 containing such a substance.

Humidity Conditioning Method

A description will be now given of a humidity conditioning method that involves use of the above-described humidity conditioning device 1002. The humidity conditioning method in accordance with the third embodiment includes a humidity-absorbing step and a regeneration step as does the humidity conditioning method in accordance with the second embodiment. In the humidity conditioning method in accordance with the present embodiment, some of liquid W12 obtained in the regeneration step is separated out and retained in the separating unit 271.

The humidity conditioning method in accordance with the present embodiment enables retaining liquid W12. Since liquid W12 contains some of the hygroscopic material dissolved in hygroscopic liquid W as described earlier, skin moisture retention effects are expected. For example, if the user wants to take care of his/her skin for better moisture retention, the ultrasonic vibrator 130 may be powered on to bombard some of liquid W12 with ultrasound, thereby generating misty droplets W22 from liquid W12.

The present embodiment provides a humidity conditioning device and a humidity conditioning method that are capable of adsorbing and desorbing moisture at low power consumption. The humidity conditioning device and the humidity conditioning method in accordance with the present embodiment are reasonably believed to help moisture retention care of the skin as well as to condition humidity outside of the housing 1.

Fourth Embodiment

The following will describe a humidity conditioning device and a humidity conditioning method in accordance with a fourth embodiment of the present invention with reference to drawings.

Humidity Conditioning Device

Figure 4:
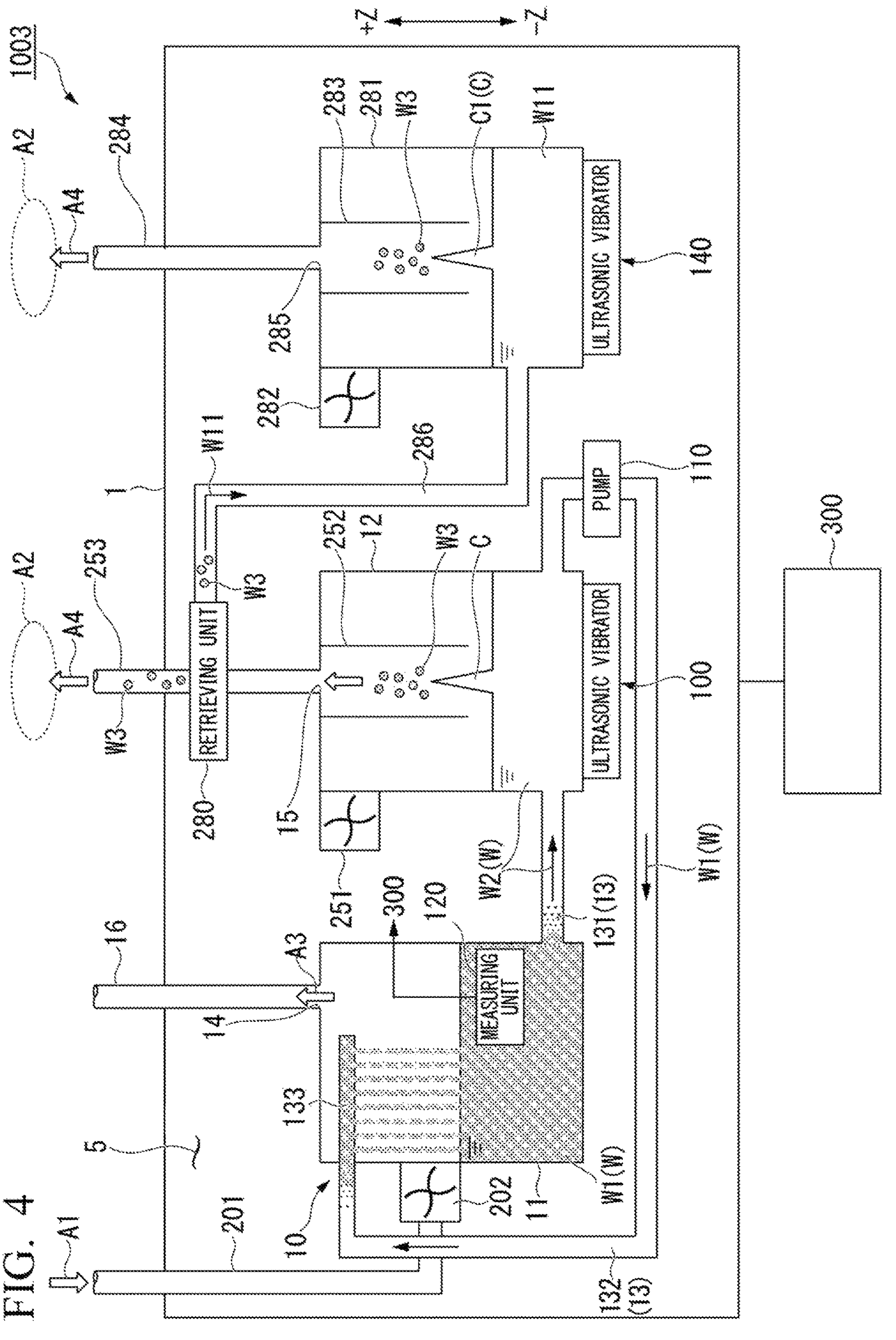
FIG. 4 is a schematic cross-sectional view of a humidity conditioning device 1003 in accordance with a fourth embodiment.

FIG. 4 is a schematic cross-sectional view of a humidity conditioning device 1003 in accordance with the fourth embodiment. Referring to FIG. 4, the humidity conditioning device 1003 in accordance with the fourth embodiment includes a housing 1, a reservoir unit 10, a measuring unit 120, a retrieving unit 280, a collecting vessel 281, a flow path 286, and a control unit 300. Members of the present embodiment that are the same as those in the second embodiment are accordingly indicated by the same reference signs or numerals, and detailed description thereof is omitted.

The combined structure of the retrieving unit 280, the collecting vessel 281, and the flow path 286 in the present specification is an equivalent of the collecting unit recited in the claims.

The retrieving unit 280 retrieves at least some of misty droplets W3. The collecting vessel 281 then collects retrieved liquid W11.

Liquid W11 in the present specification is an equivalent of the first liquid recited in the claims.

The collecting vessel 281 includes an ultrasonic vibrator 140, an opening 285, a blower 282, and a guide tube 283.

The ultrasonic vibrator 140 in the present specification is an equivalent of the second ultrasound generator recited in the claims.

The combination the blower 282 and the guide tube 283 in the present specification is an equivalent of the second means recited in the claims.

The ultrasonic vibrator 140 bombards liquid W11 with ultrasound to generate misty droplets W3 from liquid W11. The ultrasonic vibrator 140 in FIG. 1 is in contact with the bottom face (negative Z end) of the collecting vessel 281.

The opening 285 discharges air mass A4 containing misty droplets W3 into air mass A2 residing outside the housing 1, thereby removing air mass A4. To the opening 285 in FIG. 4 is connected a tube 284 for guiding A4 containing misty droplets W3 to the outside of the housing 1. The tube 284 connects the collecting vessel 281 to the outside of the housing 1 in a spatially continuous manner. The opening 285 is located directly above the ultrasonic vibrator 100.

The blower 282 feeds air from the outside of the housing 1 into the collecting vessel 281, thereby generating an air current flowing from the inside of the collecting vessel 281 to the outside of the housing 1 via the opening 285.

The guide tube 283 guides misty droplets W3 generated from liquid W11 to the opening 285. The guide tube 283 is located to surround the opening 285 when viewed from above.

Since the opening 285 is located directly above the ultrasonic vibrator 140 in the humidity conditioning device 1003 in accordance with the present embodiment, liquid column C1 of liquid W11 forms below (in the negative Z-direction from) the opening 285. Therefore, the guide tube 283 surrounds liquid column C1 of liquid W11 in the humidity conditioning device 1003 in accordance with the present embodiment. These relative positions of the opening 285, the guide tube 283, and liquid column C1 enable the air current moving in the positive Z-direction from the liquid surface of liquid W11 to carry misty droplets W3 generated in liquid column C1 of liquid W11 to the opening 285.

Humidity Conditioning Method

A description will be now given of a humidity conditioning method that involves use of the above-described humidity conditioning device 1003. The humidity conditioning method in accordance with the fourth embodiment includes a humidity-absorbing step and a regeneration step as does the humidity conditioning method in accordance with the second embodiment. In the humidity conditioning method in accordance with the present embodiment, some of misty droplets W3 obtained in the regeneration step are retrieved in the retrieving unit 280, so that the collecting vessel 281 can collect retrieved liquid W11.

The humidity conditioning method in accordance with the present embodiment enables collecting and retaining liquid W11. For instance, when air mass A2 outside the housing 1 needs to be quickly humidified, the ultrasonic vibrator 140 may be powered on to bombard some of liquid W11 with ultrasound, thereby generating misty droplets W3 from liquid W11.

The present embodiment provides a humidity conditioning device and a humidity conditioning method that are capable of adsorbing and desorbing moisture at low power consumption. The humidity conditioning device and the humidity conditioning method in accordance with the present embodiment can readily increase the quantity of generated misty droplets W3 in accordance with the operation status of the humidity conditioning device 1003.

Fifth Embodiment

The following will describe a humidity conditioning device and a humidity conditioning method in accordance with a fifth embodiment of the present invention with reference to drawings.

Humidity Conditioning Device

Figure 5:
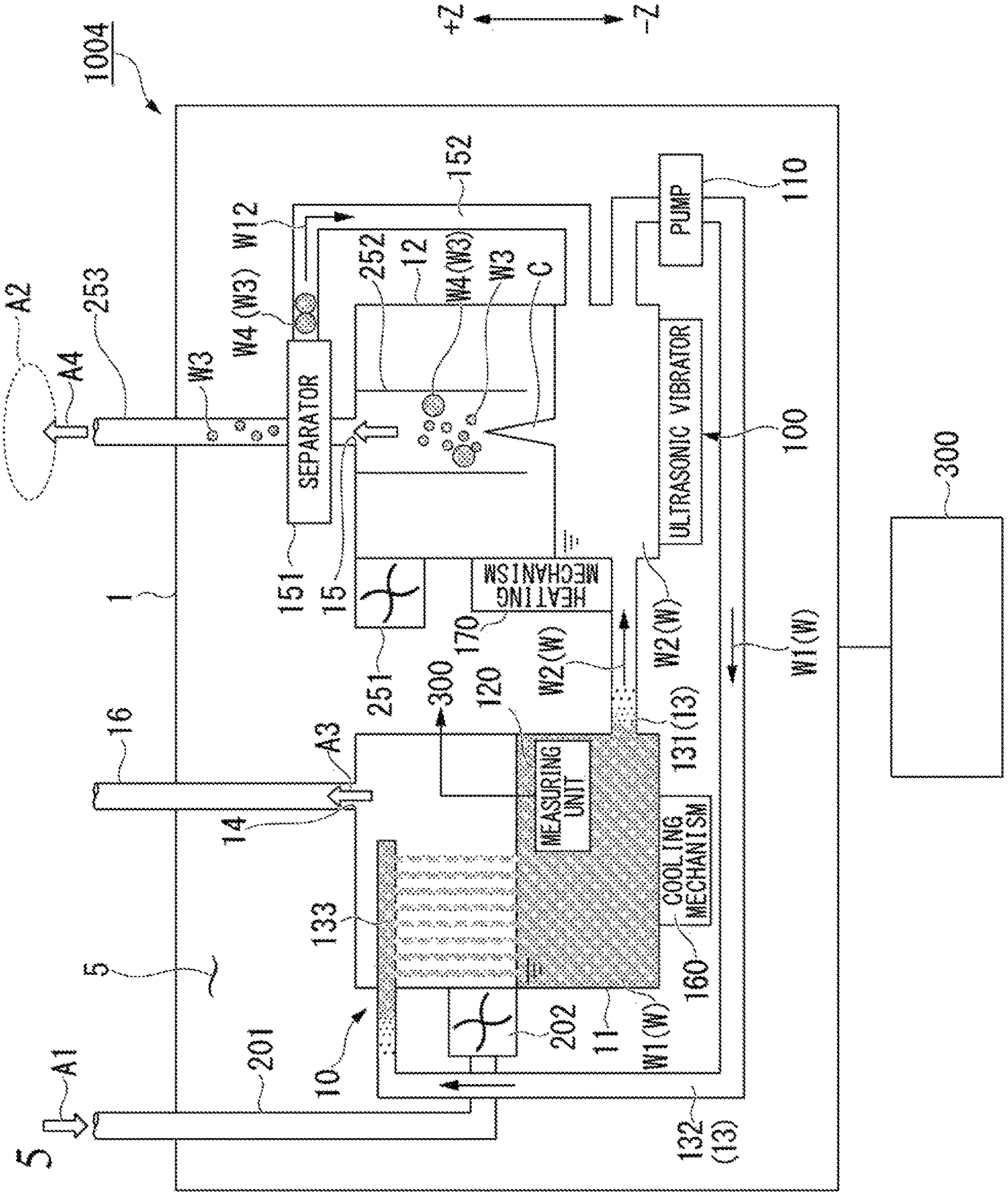
FIG. 5 is a schematic cross-sectional view of a humidity conditioning device 1004 in accordance with a fifth embodiment.

FIG. 5 is a schematic cross-sectional view of a humidity conditioning device 1004 in accordance with the fifth embodiment. Referring to FIG. 5, the humidity conditioning device 1004 in accordance with the fifth embodiment includes a housing 1, a reservoir unit 10, a measuring unit 120, a separator 151, a flow path 152, a cooling mechanism 160, a heating mechanism 170, and a control unit 300. Members of the present embodiment that are the same as those in the second embodiment are accordingly indicated by the same reference signs or numerals, and detailed description thereof is omitted.

The cooling mechanism 160 cools hygroscopic liquid W1 in the first reservoir unit 11. The cooling mechanism 160 in FIG. 5 is disposed in contact with a face of the first reservoir unit 11.

The cooling mechanism 160 is not limited in any particularly manner so long as it is capable of cooling hygroscopic liquid W1 in the first reservoir unit 11. The cooling mechanism 160 may be, for instance, a Peltier element.

The heating mechanism 170 cools hygroscopic liquid W2 in the second reservoir unit 12. The heating mechanism 170 in FIG. 5 is disposed in contact with a face of the second reservoir unit 12.

The heating mechanism 170 is not limited in any particularly manner so long as it is capable of heating hygroscopic liquid W2 in the second reservoir unit 12. The heating mechanism 170 may be, for instance, a heater.

This combination of the cooling mechanism 160 and the heating mechanism 170, in the present embodiment, may be replaced by a combination of a Peltier element serving as the cooling mechanism 160 and the heat dissipation section of the Peltier element serving as the heating mechanism 170.

Humidity Conditioning Method

A description will be now given of a humidity conditioning method that involves use of the above-described humidity conditioning device 1004. The humidity conditioning method in accordance with the fifth embodiment performs a humidity-absorbing step while cooling hygroscopic liquid W1 by the cooling mechanism 160. The humidity conditioning method in accordance with the fifth embodiment also performs a regeneration step while heating hygroscopic liquid W2 by the heating mechanism 170.

The cooling of hygroscopic liquid W1 in the humidity-absorbing step of the present embodiment can increase moisture absorption over the same operating time.

The heating of hygroscopic liquid W2 in the regeneration step of the present embodiment can increase the quantity of generated misty droplets W3 over the same operating time. Therefore, the fifth embodiment provides a humidity conditioning device and a humidity conditioning method that are capable of adsorbing and desorbing moisture at lower power consumption than does the second embodiment.

The humidity conditioning device 1004 in accordance with the present embodiment has been described as including both the cooling mechanism 160 and the heating mechanism 170 as an example. The humidity conditioning device in accordance with an aspect of the present invention is however not necessarily limited to this example. For instance, the humidity conditioning device in accordance with an aspect of the present invention may include either one of the cooling mechanism 160 and the heating mechanism 170, which still achieves the same effects as the present embodiment.

The present embodiment provides a humidity conditioning device and a humidity conditioning method that are capable of adsorbing and desorbing moisture at even lower power consumption.

Sixth Embodiment

The following will describe a humidity conditioning device and a humidity conditioning method in accordance with a sixth embodiment of the present invention with reference to drawings.

Humidity Conditioning Device

Figure 6:
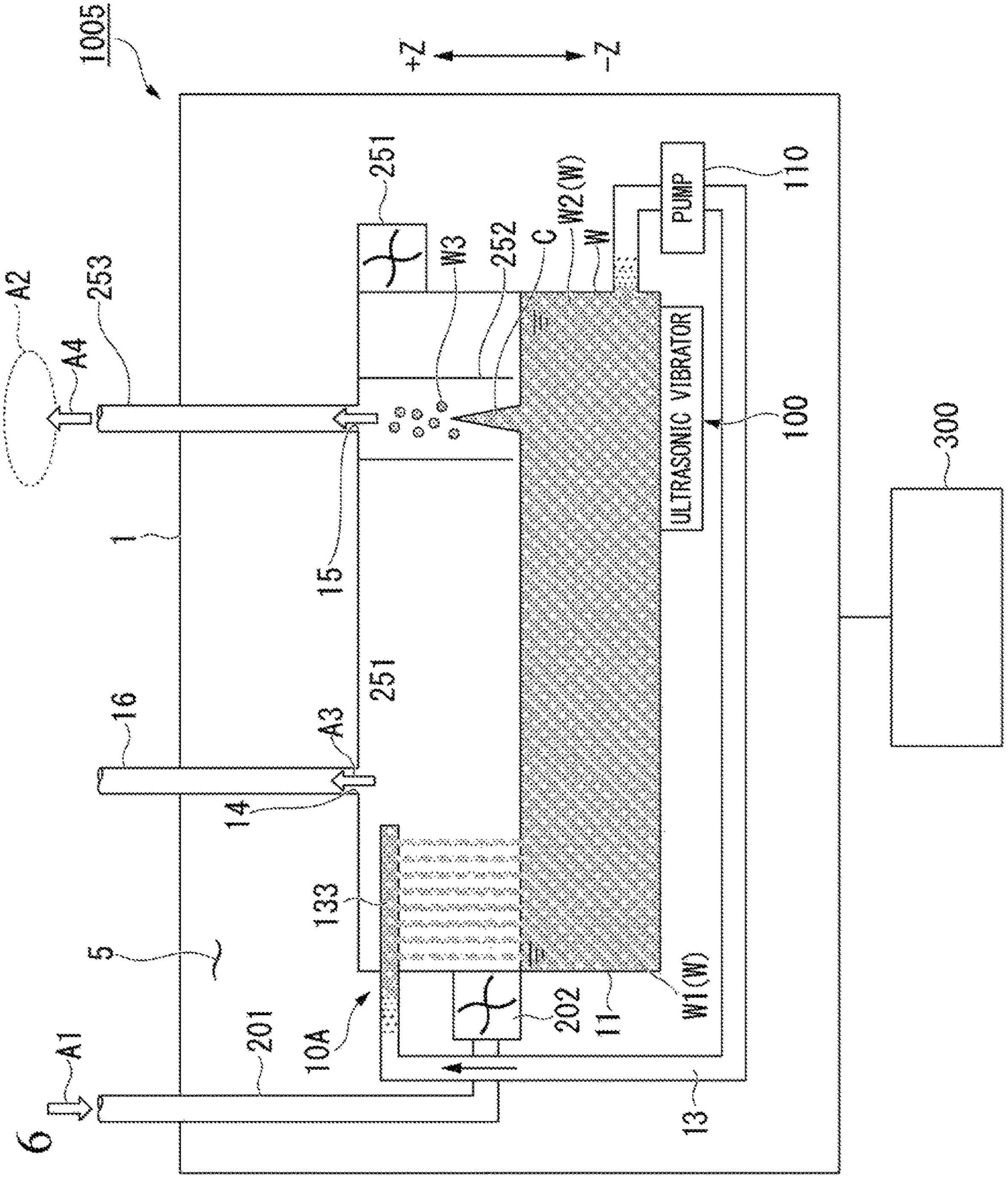
FIG. 6 is a schematic cross-sectional view of a humidity conditioning device 1005 in accordance with a sixth embodiment.

FIG. 6 is a schematic cross-sectional view of a humidity conditioning device 1005 in accordance with the sixth embodiment. Referring to FIG. 6, the humidity conditioning device 1005 in accordance with the sixth embodiment includes a housing 1 and a reservoir unit 10A. Members of the present embodiment that are the same as those in the first embodiment are accordingly indicated by the same reference signs or numerals, and detailed description thereof is omitted.

The reservoir unit 10 in the humidity conditioning device 1000 in accordance with the first embodiment includes two reservoir units. In contrast, the reservoir unit 10A in the humidity conditioning device 1005 in accordance with the sixth embodiment includes a single reservoir unit. The reservoir unit 10A of the present embodiment therefore includes a tube 201, a blower 202, a first air outlet port 14, a second air outlet port 15, an ultrasonic vibrator 100, a blower 251, and a guide tube 252.

The guide tube 252 of the present embodiment divides the interior of the reservoir unit 10A into a compartment to which the first air outlet port 14 is open and a compartment to which the second air outlet port 15 is open. This structure may restrain air mass A3 from being discharged through the second air outlet port 15 and air mass A4 from being discharged through the first air outlet port 14, for example, when the humidity-absorbing step and the regeneration step are simultaneously performed by the humidity conditioning device 1005 in accordance with the present embodiment according to the humidity conditioning method detailed later.

Humidity Conditioning Method

A description will be now given of a humidity conditioning method that involves use of the above-described humidity conditioning device 1005.

The present embodiment includes a humidity-absorbing step where the blower 202 for the reservoir unit 10A is powered on to supply air mass A1 from the outside of the housing 1 to the internal space 5 of the housing 1 via the tube 201. Air mass A1 hence comes into contact with hygroscopic liquid W in the reservoir unit 10A, so that hygroscopic liquid W1 can absorb moisture in air mass A1.

In the humidity-absorbing step of the present embodiment, moisture is removed from air mass A1 to obtain air mass A3, and air mass A3 thus obtained is discharged through the first air outlet port 14 of the reservoir unit 10A.

The present embodiment includes a regeneration step where the blower 251 for the reservoir unit 10A is powered on to generate an air current in the reservoir unit 10A beforehand. First, the ultrasonic vibrator 100 is powered on to bombard some of hygroscopic liquid W with ultrasound, thereby generating moisture-containing misty droplets W3 from hygroscopic liquid W.

Misty droplets W3 thus obtained are carried by the air current and discharged via the second air outlet port 15 in the regeneration step of the present embodiment. In contrast, in the regeneration step of the present embodiment, moisture is separated from hygroscopic liquid W2 to regenerate hygroscopic liquid W1. The humidity conditioning method in accordance with the present embodiment is implemented in this manner.

Similarly to the first embodiment, the present embodiment provides a humidity conditioning device and a humidity conditioning method capable of adsorbing and desorbing moisture at low power consumption. Additionally, the humidity conditioning device in accordance with the present embodiment is smaller than the humidity conditioning device in accordance with the first embodiment.

Seventh Embodiment

The following will describe a humidity conditioning device and a humidity conditioning method in accordance with a seventh embodiment of the present invention with reference to drawings.

Humidity Conditioning Device

Figure 7:
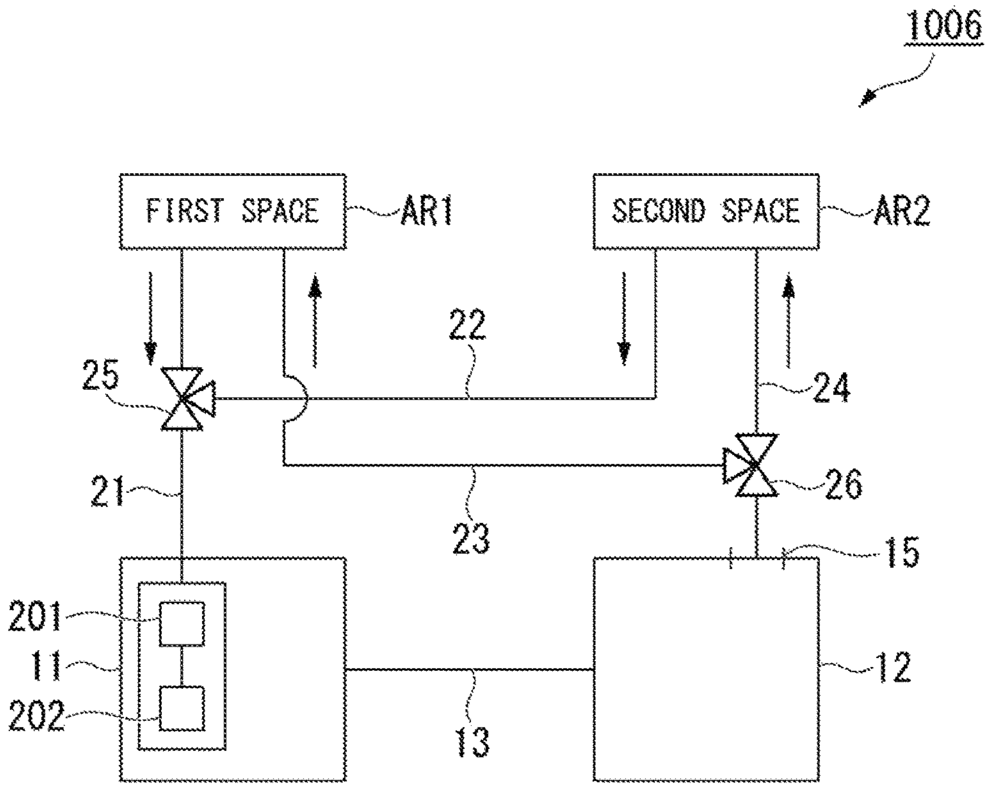
FIG. 7 is a schematic cross-sectional view of a humidity conditioning device 1006 in accordance with a seventh embodiment.

FIG. 7 is a schematic cross-sectional view of a humidity conditioning device 1006 in accordance with the seventh embodiment. Referring to FIG. 7, the humidity conditioning device 1006 in accordance with the seventh embodiment is the same as the humidity conditioning device 1006 in accordance with the second embodiment, except that the humidity conditioning device 1006 in accordance with the seventh embodiment includes a first air inlet tube 21, a second air inlet tube 22, a third air outlet tube 23, a fourth air outlet tube 24, a first switching section 25, and a second switching section 26. Members of the present embodiment that are the same as those in the second embodiment are accordingly indicated by the same reference signs or numerals, and detailed description thereof is omitted. FIG. 7 does not show the housing 1, the measuring unit 120, the separator 151, the flow path 152, and the control unit 300.

The first air inlet tube 21 connects the tube 201 and the blower 202 of the first reservoir unit 11 to a first space AR1.

The second air inlet tube 22 connects the tube 201 and the blower 202 of the first reservoir unit 11 to a second space AR2.

The third air outlet tube 23 connects the second air outlet port 15 to the first space AR1.

The fourth air outlet tube 24 connects the second air outlet port 15 to the second space AR2.

The first switching section 25 switches between the first air inlet tube 21 and the second air inlet tube 22.

The second switching section 26 switches between the third air outlet tube 23 and the fourth air outlet tube 24.

The first switching section 25 and the second switching section 26 operate in concert so as to suck in air mass A1 from either one of the first space AR1 and the second space AR2 and vent out air mass A3 to the other one of the first space AR1 and the second space AR2.

The first space AR1 and the second space AR2 are different spaces in the humidity conditioning device 1006 in accordance with the present embodiment. As an example, the first space AR1 may be an indoor space, and the second space AR2 may be an outdoor space.

Humidity Conditioning Method

A description will be now given of a humidity conditioning method that involves use of the above-described humidity conditioning device 1006.

In the humidity conditioning method in accordance with the seventh embodiment, firstly, the first switching section 25 is driven to switch to the first air inlet tube 21, so that the first space AR1 is connected to the tube 201 and the blower 202 of the first reservoir unit 11. The second switching section 26 operates in concert with the first switching section 25 to switch to the fourth air inlet tube 24, so that the second space AR2 is connected to the second air outlet port 15.

Next, air mass A1 is sucked in from the first space AR1, and a humidity-absorbing step is performed as in the second embodiment. Meanwhile, a regeneration step is performed as in the second embodiment to discharge air mass A3 to the second space AR2.

The present embodiment provides a humidity conditioning device and a humidity conditioning method capable of adsorbing and desorbing moisture at low power consumption similarly to the second embodiment. The present embodiment additionally enables selection of a space subjected to humidity conditioning regardless of where the humidity conditioning device 1006 is located.

Eighth Embodiment

The following will describe a humidity conditioning device and a humidity conditioning method in accordance with an eighth embodiment of the present invention with reference to drawings.

Humidity Conditioning Device

Figure 8:
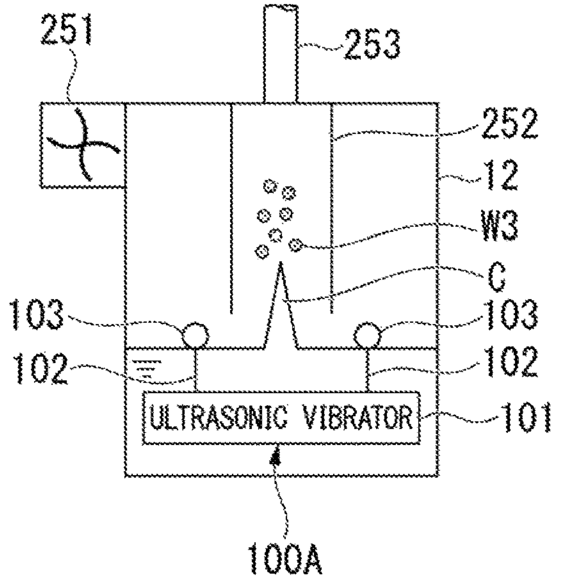
FIG. 8 is a schematic cross-sectional view of peripherals of a second reservoir unit 12 in accordance with an eighth embodiment.

FIG. 8 is a schematic cross-sectional view of peripherals of a second reservoir unit 12 in accordance with the eighth embodiment. Referring to FIG. 8, the second reservoir unit 12 in accordance with the eighth embodiment is the same as the second reservoir unit 12 in accordance with the second embodiment, except that an ultrasonic vibrator 100A in accordance with the eighth embodiment includes a main body unit 101, linking sections 102, and floats 103. Members of the present embodiment that are the same as those in the second embodiment are accordingly indicated by the same reference signs or numerals, and detailed description thereof is omitted.

The ultrasonic vibrator 100A in accordance with the present embodiment is of an immersion type. The term, "immersion type," as used herein indicates that the main body unit 101 of the ultrasonic vibrator 100A is immersed in hygroscopic liquid W.

The main body unit 101 generates ultrasound. The floats 103 have a lower specific gravity than hygroscopic liquid W and floats near the liquid surface of hygroscopic liquid W due to the buoyancy. The linking sections 102 link the main body unit 101 and the floats 103.

The main body unit 101 and the floats 103, linked by the linking sections 102, are separated by a fixed distance. This structure can fix the depth at which the surface of the ultrasonic vibrator 100A resides below the liquid surface of hygroscopic liquid W even when the distance from the bottom face (negative Z end) of the second reservoir unit 12 to the liquid surface of hygroscopic liquid W may vary. This capability of adjusting the depth at which the surface of the ultrasonic vibrator 100A resides below the liquid surface of hygroscopic liquid W enables control of the quantity of generated misty droplets W3. The quantity of generated misty droplets W3 can be hence easily controlled even when the distance from the bottom face of the second reservoir unit 12 to the liquid surface of hygroscopic liquid W may vary.

The present embodiment provides a humidity conditioning device and a humidity conditioning method capable of adsorbing and desorbing moisture at low power consumption similarly to the second embodiment. The present embodiment additionally facilitates the control of the quantity of generated misty droplets W3 even when the distance from the bottom face of the second reservoir unit 12 to the liquid surface of hygroscopic liquid W may vary.

The description has so far discussed various embodiments of the present invention. The members and structures and their combinations in the embodiments are mere examples. The embodiments may be altered in various manners, for example, by omitting the existing members and structures and adding or substituting new members and structures, without departing from the scope of the present invention. The present invention is not limited by embodiments.

As an example, the embodiments have been described as employing a free-fall mechanism including the tube 201 and the blower 202, to absorb moisture from air mass A1. Alternatives are also possible. FIGS. 9A to 9D are schematic cross-sectional views of a humidity-absorbing mechanism for air mass A1.

Figure 9A:
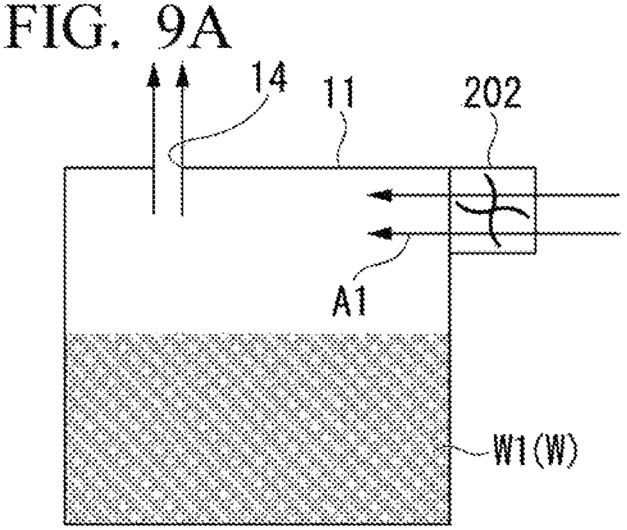
FIG. 9A is a first schematic cross-sectional view of a humidity-absorbing mechanism for air mass A1.

Moisture may be absorbed from air mass A1 by a mechanism shown in FIG. 9A, where hygroscopic liquid W1 sits still in an air current of air mass A1 generated by the blower 202.

Figure 9B:
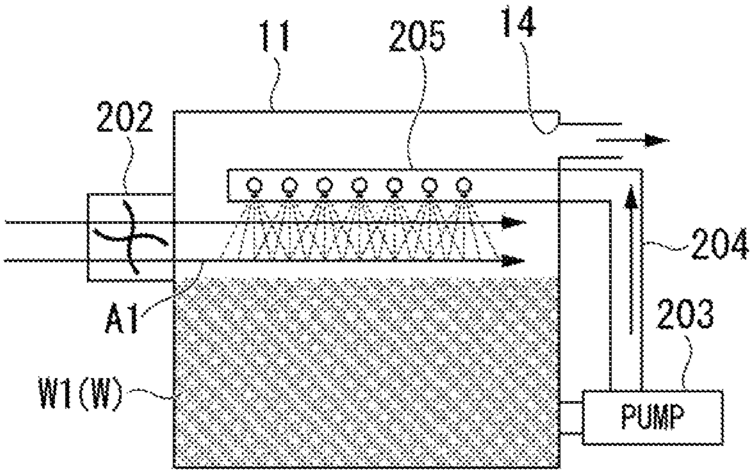
FIG. 9B is a second schematic cross-sectional view of a humidity-absorbing mechanism for air mass A1.

An alternative is a spray mechanism shown in FIG. 9B, where misty hygroscopic liquid W is sprayed into an air current of air mass A1 generated by the blower 202. A humidity conditioning device that implements this mechanism includes, for example, a pump 203 feeding hygroscopic liquid W1 from the first reservoir unit 11, a pipe 204 transporting hygroscopic liquid W1 fed by the pump 203, and a spray nozzle 205 disposed at an end of the pipe 204. The spray nozzle 205 is located above the liquid surface of hygroscopic liquid W1 contained in the first reservoir unit 11.

By generating misty hygroscopic liquid W, the humidity conditioning device thus structured can increase the surface area of hygroscopic liquid W, so that hygroscopic liquid W can efficiently absorb moisture in air mass A1.

Figure 9C:
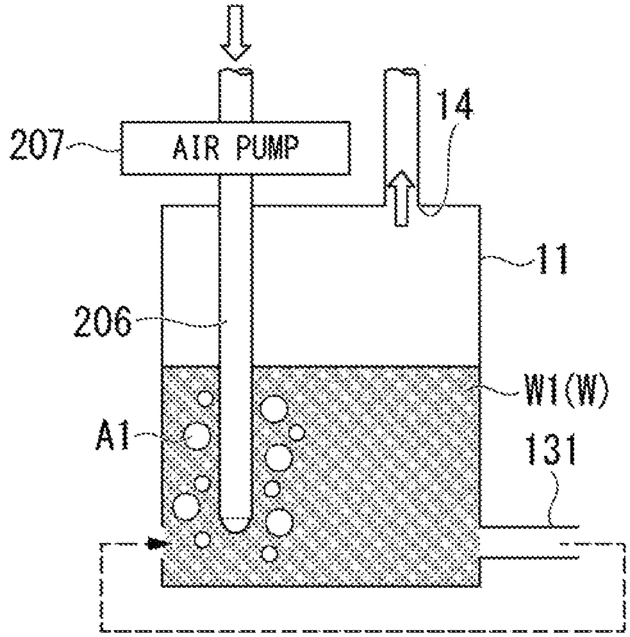
FIG. 9C is a third schematic cross-sectional view of a humidity-absorbing mechanism for air mass A1.

Another alternative is a bubbling mechanism shown in FIG. 9C, where an air pump 207 generates bubbles of air mass A1 in hygroscopic liquid W1. The first reservoir unit 11 of a humidity conditioning device that implements this mechanism includes, for example, a tube 206 and an air pump 207.

The tube 206 connects the internal space 5 of the housing 1 (see FIG. 1) to the outside of the housing 1 in a spatially continuous manner. The tube 206 has an end thereof housed inside the internal space 5 and immersed in hygroscopic liquid W1 in the internal space 5.

The tube 206 is connected to the air pump 207 that supplies air mass A1 outside the housing 1.

The air pump 207 supplies air mass A1 outside the housing 1 to the internal space 5 of the housing 1 via the tube 206. Air mass A1 fed by the air pump 207 forms bubbles at an end of the tube 206 and come into contact with hygroscopic liquid W1.

By bringing bubbly air mass A1 into contact with hygroscopic liquid W1 in the internal space 5, the humidity conditioning device thus structured can increase the contact area of air mass A1 and hygroscopic liquid W1, so that hygroscopic liquid W1 can efficiently absorb moisture in air mass A1.

Figure 9D:
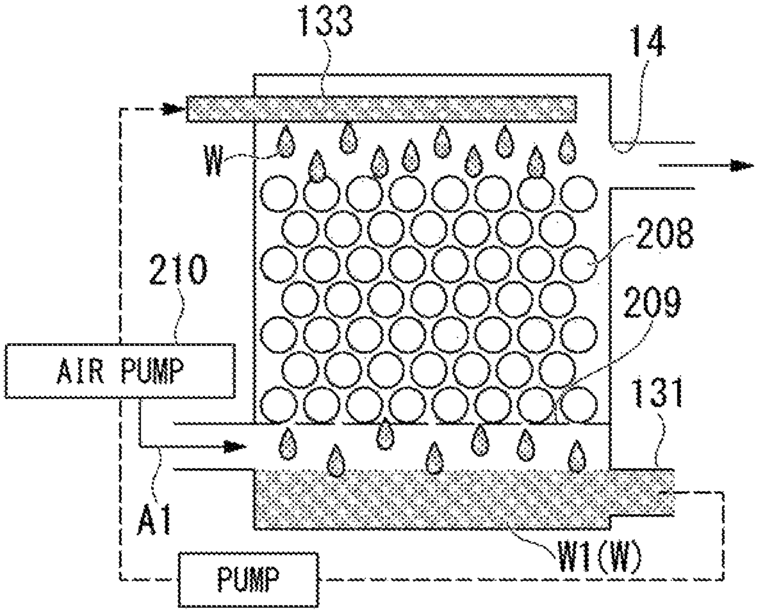
FIG. 9D is a fourth schematic cross-sectional view of a humidity-absorbing mechanism for air mass A1.

A further alternative is a column mechanism shown in FIG. 9D, where a column is infused with hygroscopic liquid W in an air current of air mass A1 generated by an air pump 210. The first reservoir unit 11 in a humidity conditioning device that implements this mechanism includes, for example, a plurality of filling members 208, a support plate 209 providing support for the filling members 208, an air pump 210 for supplying external air mass A1, and a nozzle unit 133.

The filling members 208 are, for example, glass beads or like bodies that are made of a substance that does not degrade in hygroscopic liquid W.

The support plate 209 has pores so small that the filling members 208 cannot pass through the pores and is disposed below the first reservoir unit 11. The filling members 208 sit on the support plate 209 inside the first reservoir unit 11.

The air pump 210 feeds air mass A1 to the space below the support plate 209 near the bottom of the first reservoir unit 11, thereby generating an air current of air mass A1 flowing upward from below the filling members 208 in the first reservoir unit 11.

As hygroscopic liquid W flows downward from the nozzle unit 133 in such a humidity conditioning device, hygroscopic liquid W flows down the surfaces of the filling members 208 toward below the first reservoir unit 11. As the air pump 210 generates an air current of air mass A1 in this condition, air mass A1 comes into contact with hygroscopic liquid W on the surfaces of the filling members 208.

By spreading hygroscopic liquid W over the surfaces of the filling members 208, the humidity conditioning device thus structured can increase the contact area of air mass A1 and hygroscopic liquid W, so that hygroscopic liquid W can efficiently absorb moisture in air mass A1.

As another example, the embodiments have been described as including a single ultrasonic vibrator 100. The number of ultrasonic vibrators 100 is however not necessarily limited to one and may be two or greater. In such alternatives, the interval(s) between adjacent ultrasonic vibrators 100 may be adjusted such that the liquid columns C generated by the ultrasonic vibrators 100 do not collide with each other. Similar alternative are possible with the ultrasonic vibrator 130 and the ultrasonic vibrator 140.

As a further example, the embodiments have been described as including a guide tube 252 as a guide member recited in the claims. Alternatives are possible. For instance, in an aspect of the present invention, the guide member may be a partition board disposed at the boundary between a compartment to which the first air outlet port 14 is open and a compartment to which the second air outlet port 15 is open. Similar alternative are possible with the guide tube 273 and the guide tube 283.

As still another example, the embodiments have been described as the first air outlet port 14 and the second air outlet port 15 being located on the top face (positive Z end) of the first reservoir unit 11 and the top face (positive Z end) of the second reservoir unit 12 respectively. The locations of the first air outlet port 14 and the second air outlet port 15 are however not necessarily limited to this example. For example, the first air outlet port 14 and the second air outlet port 15 may be disposed on any faces of the reservoir units, except for the bottom faces (negative Z ends) of the reservoir units.

INDUSTRIAL APPLICABILITY

The present invention, in an aspect thereof, is applicable, for example, to humidity conditioning methods where moisture needs to be adsorbed and desorbed at low power consumption.

REFERENCE SIGNS LIST

1 Housing
5 Internal Space
10, 10A Reservoir Unit
11 First Reservoir Unit
12 Second Reservoir Unit
13, 131, 132, 152, 153, 286 Flow Path
14 First Air Outlet Port
15 Second Air Outlet Port
21 First Air Inlet Tube
22 Second Air Inlet Tube
23 Third Air Outlet Tube
24 Fourth Air Outlet Tube
25 First Switching Section
26 Second Switching Section
101 Main Body Unit
102 Linking Section
103 Float
160 Cooling Mechanism
170 Heating Mechanism
1000, 1001, 1002, 1003, 1004, 1005, 1006 Humidity Conditioning Device
A1, A2, A3, A4 Air Mass
AR1 First Space
AR2 Second Space
W, W1, W2 Hygroscopic Liquid
W3, W22 Misty Droplet
W4 Coarse Droplet
W11, W12 Liquid

The invention claimed is:

1. A humidity conditioning device comprising:

a housing having an internal space; and a reservoir unit in the internal space, the reservoir unit being configured to retain a hygroscopic liquid containing a hygroscopic material, wherein the reservoir unit includes:

an absorption tube, a blower, and a nozzle unit to feed air outside the housing to the internal space to bring the air and the hygroscopic liquid in the internal space into contact with each other, so that the hygroscopic liquid absorbs moisture in the air;

an air outlet port connecting the reservoir unit to an outside of the housing in a spatially continuous manner;

a first ultrasound generator configured to bombard at least some of the hygroscopic liquid having absorbed moisture with ultrasound; and the blower and a guide tube to remove misty droplets generated from the hygroscopic liquid having absorbed moisture.

2. The humidity conditioning device according to claim 1, further including a Peltier element to cool the hygroscopic liquid.

3. The humidity conditioning device according to claim 1, further including a heater or a Peltier element to heat the hygroscopic liquid having absorbed moisture.

4. The humidity conditioning device according to claim 1, further including a retrieving unit, a collecting vessel, and a flow path to retrieve at least some of the misty droplets to obtain and collect a first liquid.

5. The humidity conditioning device according to claim 4, wherein the retrieving unit, the collecting vessel, and the flow path includes:

a second ultrasound generator configured to bombard at least some of the collected first liquid with ultrasound; and the blower and the guide tube to remove misty droplets generated from the first liquid.

6. The humidity conditioning device according to claim 1, wherein the misty droplets include coarse droplets containing some of the hygroscopic material, the humidity conditioning device further comprising a separator and a flow path to separate out and retrieve the coarse droplets to obtain a second liquid and configured further to mix at least some of the second liquid with the hygroscopic liquid.

7. The humidity conditioning device according to claim 6, further comprising:

a third ultrasound generator configured to bombard at least some of the second liquid with ultrasound; and the blower and the guide tube to remove misty droplets of the second liquid generated from the second liquid.

8. The humidity conditioning device according to claim 1, wherein the air outlet port includes a first air outlet port and a second air outlet port, and the blower and the guide tube includes a compartment to which the first air outlet port is open, a compartment to which the second air outlet port is open, and a guide member dividing an interior of the reservoir unit.

9. The humidity conditioning device according to claim 1, wherein the air outlet port includes a first air outlet port and a second air outlet port, the reservoir unit includes a first reservoir unit, a second reservoir unit, and a flow path connecting the first reservoir unit to the second reservoir unit, the first reservoir unit is provided with the absorption tube, the blower, the nozzle unit, and the first air outlet port, and the second reservoir unit is provided with the first ultrasound generator, the blower, the guide tube, and the second air outlet port.

10. The humidity conditioning device according to claim 8, further comprising:

a first air inlet tube connecting the absorption tube, the blower, and the nozzle unit to a first space;

a second air inlet tube connecting the absorption tube, the blower, and the nozzle unit to a second space;

a first switching valve to switch between the first air inlet tube and the second air inlet tube;

a third air outlet tube connecting the second air outlet port to the first space;

a fourth air outlet tube connecting the second air outlet port to the second space; and a second switching valve to switch between the third air outlet tube and the fourth air outlet tube, wherein the first switching valve and the second switching valve operate in concert so as to suck in the air from either one of the first space and the second space and vent out the air into the other one of the first space and the second space.

11. The humidity conditioning device according to claim 10, wherein the first space is an indoor space, and the second space is an outdoor space.

* * * * *